United States Patent
Showcatally et al.

(10) Patent No.: US 9,059,538 B2
(45) Date of Patent: Jun. 16, 2015

(54) ELECTRICAL CONDUCTOR ASSEMBLY FOR INTRA-ENCLOSURE CONDUCTOR TERMINATION

(71) Applicant: Itron, Inc., Liberty Lake, WA (US)

(72) Inventors: Shawn Showcatally, Mankato, MN (US); Thomas Breitenfeldt, Mankato, MN (US)

(73) Assignee: Itron, Inc., Liberty Lake, WA (US)

( * ) Notice: Subject to any disclaimer, the term of this patent is extended or adjusted under 35 U.S.C. 154(b) by 187 days.

(21) Appl. No.: 13/829,201

(22) Filed: Mar. 14, 2013

(65) Prior Publication Data
US 2014/0273619 A1    Sep. 18, 2014

(51) Int. Cl.
| | |
|---|---|
| H01R 13/62 | (2006.01) |
| H01B 17/26 | (2006.01) |
| H01B 17/58 | (2006.01) |
| H02G 3/22 | (2006.01) |
| H01R 13/60 | (2006.01) |
| H01R 43/00 | (2006.01) |
| H01R 13/52 | (2006.01) |
| H01R 13/58 | (2006.01) |
| H01R 12/53 | (2011.01) |
| H01R 13/74 | (2006.01) |

(52) U.S. Cl.
CPC ............... *H01R 13/60* (2013.01); *H01R 43/00* (2013.01); *Y10T 29/49117* (2015.01); *H01R 13/62* (2013.01); *H01B 17/26* (2013.01); *H02G 3/22* (2013.01); *H01B 17/58* (2013.01); *H01R 12/53* (2013.01); *H01R 13/5208* (2013.01); *H01R 13/5825* (2013.01); *H01R 13/748* (2013.01)

(58) Field of Classification Search
USPC ......... 439/550, 559, 545, 546, 589, 404, 676, 439/941, 271, 460–465, 679, 454, 456; 174/481, 650, 659, 72 A, 73.1, 74 R, 174/77 R, 88 R
See application file for complete search history.

(56) References Cited

U.S. PATENT DOCUMENTS 3,092,360 A    6/1963   Cook et al.
3,905,672 A *  9/1975   Anhalt et al. ................. 439/281
(Continued)

FOREIGN PATENT DOCUMENTS

| JP | H08335418 | 12/1996 |
| JP | 2006140011 | 6/2006 |
| WO | WO2006131723 | 12/2006 |

OTHER PUBLICATIONS

PCT Search Report and Written Opinion mailed Jun. 27, 2014 for PCT Application No. PCT/US14/22095, 15 Pages.

*Primary Examiner* — Abdullah Riyami
*Assistant Examiner* — Harshad Patel
(74) *Attorney, Agent, or Firm* — Lee & Hayes, PLLC

(57) ABSTRACT

An electrical conductor assembly includes a connector body with a plurality of grooves disposed on a periphery of the connector body and configured to guide corresponding flying leads of a cable along the connector body from one end ("proximal end") of the connector body to another end ("distal end"). A mountable fastener may be positioned around the cable, coupled to the connector body, and mounted to an enclosure. In this configuration, the ends of the flying leads extend beyond the distal end of the connector body in fixed, spaced, relative location from each other so that they may be terminated within the enclosure and protected from environmental contaminants outside of the enclosure. The coupling of the mountable fastener to the connector body provides strain relief on the individual flying leads by clamping insulation of the flying leads between the mountable fastener and the connector body.

21 Claims, 6 Drawing Sheets

(56) References Cited

U.S. PATENT DOCUMENTS

| | | | |
|---|---|---|---|
| 4,174,882 A * | 11/1979 | McCartney | 385/71 |
| 4,267,401 A * | 5/1981 | Wilkinson | 174/77 R |
| 4,281,887 A * | 8/1981 | Luca, Jr. | 439/449 |
| 5,766,037 A * | 6/1998 | Nelson | 439/583 |
| 6,113,429 A | 9/2000 | Weigel et al. | |
| 6,426,462 B1 * | 7/2002 | Mignon et al. | 174/651 |

* cited by examiner (Section A-A)

(Section A-A)

Section B-B

ELECTRICAL CONDUCTOR ASSEMBLY FOR INTRA-ENCLOSURE CONDUCTOR TERMINATION

BACKGROUND

Certain electronic devices are configured to receive electrical signals from an external source via electrical conductors, such as wires. Accordingly, the electrical conductors coming from the external source must be terminated (i.e., connected to an endpoint) at the electronic device. Terminating electrical conductors at an endpoint can be accomplished in a variety of ways. For example, the electrical conductors can be plugged into a connector disposed on an outside panel of an enclosure (e.g., an external housing of the electronic device). Alternatively, the electrical conductors can be passed through the enclosure of the electronic device whereby the electrical conductors are terminated at a printed circuit board (PCB) or other component inside the enclosure.

For some electronic devices, such as those that are to be used in outdoor environments, the manner in which electrical conductors are terminated at the electronic device may necessitate a more sophisticated technique to ensure that water or other contaminants do not penetrate the enclosure of the device and damage electrical components therein. One approach for providing reliable termination of electrical conductors, specifically with a device having connection points on its external housing, is to utilize potting in the connector bodies at the point of termination and internally to the product. Potting (e.g., urethane potting) acts as a sealant to prevent the ingress of water or other contaminants where electrical components and/or conductors may be exposed to the environment and susceptible to damage.

FIG. 1 illustrates an exemplary prior art connection between an electronic device 100 (only a portion of the electronic device 100 shown for illustration) and a connector 102 using potting 104 to protect the electrical components and conductors that would otherwise be exposed to the environment and a potting 105 to protect the electrical components in the inside of the enclosure. As shown in FIG. 1, an electrical component(s) 106, such as a PCB, is disposed inside the electronic device 100 and is electrically coupled to one or more component connectors 108. The component connectors 108 are provided through a panel that is part of an enclosure 110 of the device 100. The connector 102 contains a cable 112 including multiple electrical conductors 114 provided with insulating sheaths that may be vulnerable to water and other contaminants when terminated in the environment. Accordingly, the potting 104 isolates the conductors 114 located on the environment side of the connection and acts as a sealant material that adheres to the insulation of the cable 112 and the electrical conductors 114, as well as other materials of the connector 102. However, contamination on component parts may inhibit adhesion of the potting/sealant which leads to ingress of water and other contaminants to electrical components and conductors on the environmental side of the connection. This adverse affect is shown in FIG. 1 by the lines of fluid (e.g., water) entering between adhesion interfaces of the potting 104.

In addition to interface contamination, the use of potting with external connectors has several drawbacks. For example, connector pottings are difficult to manufacture. In general, existing conductor termination configurations for electronic devices, with or without potting, are either difficult to manufacture or vulnerable to environmental damage, and sometimes both.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
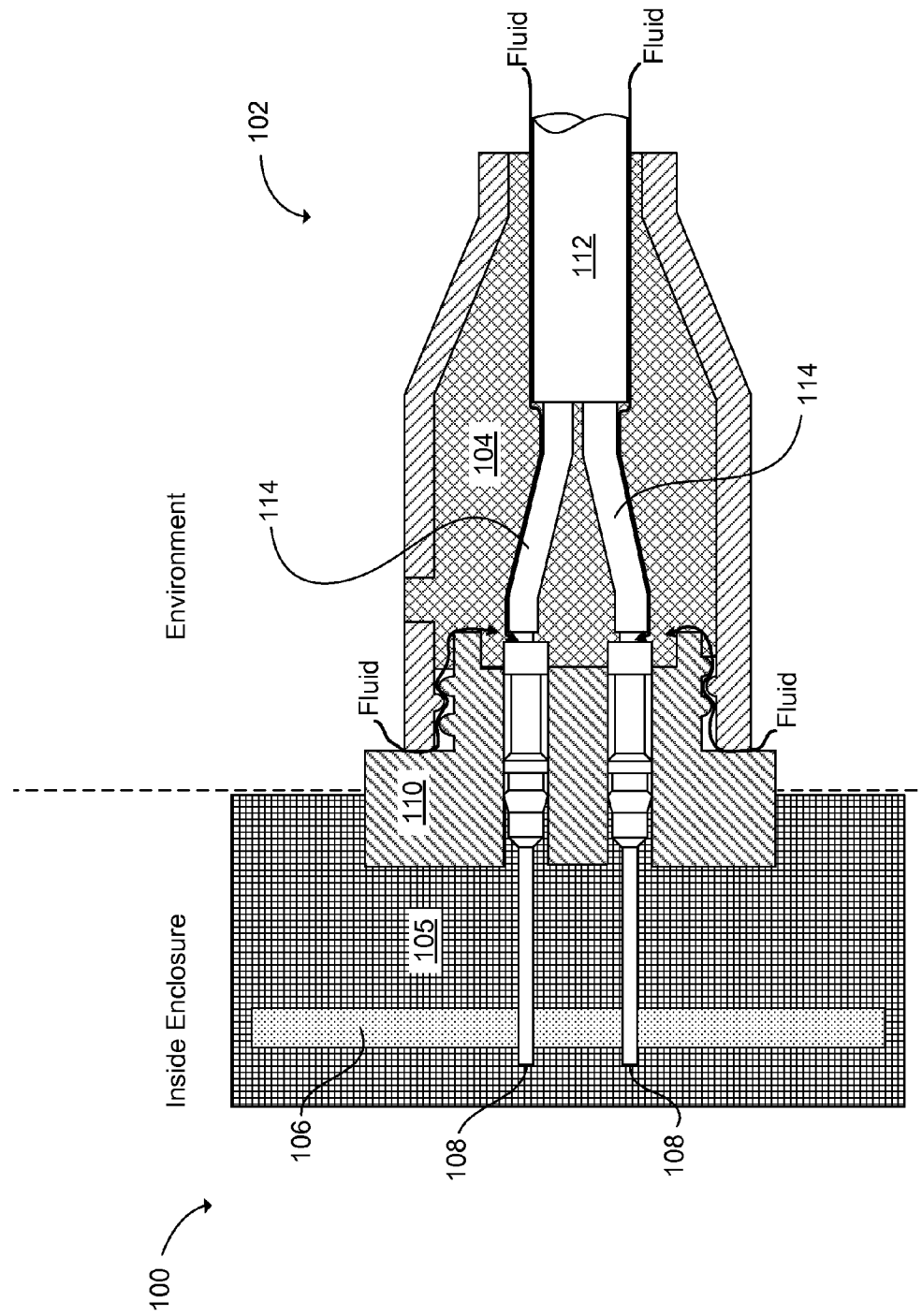
FIG. 1 illustrates an exemplary prior art connection between an electronic device and a connector using potting to protect the electrical components and conductors that are otherwise exposed to the environment.

In electrical wiring, multiple electrical conductors (e.g., wires) may be provided within insulating sheaths, which are then encased within an outer casing, or jacket, to make up what is sometimes referred to as a "cable" of multiple electrical conductors. In some instances, such as those previously described, the electrical conductors originate from a source and are to be terminated at an electronic device separate from the source. A portion of the outer casing is typically removed at the end of the cable to expose the multiple electrical conductors with insulating sheaths. Before the electrical conductors are terminated at the electronic device they are stripped at the end to remove the insulating sheaths and typically tin dipped. The portions of the multiple electrical conductors that are exposed from the outer casing in this configuration are referred to as "flying leads," due to their haphazard orientation at an exit point of the cable containing them.

The flying leads of a cable are often difficult to locate for purposes of automated manufacture and assembly (i.e., automation). Thus, human intervention is generally required to position the flying leads into their final positions/locations for any downstream manufacturing operation(s) (i.e. soldering the electrical conductors to PCBs or other components). After terminating the electrical conductors at an electronic device, the electrical conductors and other electrical components, in some instances, may be exposed to the environment and thereby subjected to damage from elements in the environment where the electronic device is implemented. Current techniques for electrical conductor termination have been insufficient for rapid automation, as well as long term reliability of an associated device.

Disclosed herein is an electrical conductor assembly, and a process of manufacturing and assembling the same, which is configured to be mounted to an enclosure of an associated electronic device for termination of electrical conductors within the device enclosure.

In some embodiments, the electrical conductor assembly includes a connector body with a plurality of grooves disposed on a periphery of the connector body, the grooves configured to guide corresponding flying leads of a cable along the connector body from one end ("proximal end") of the connector body to another end ("distal end"). A mountable fastener positioned around the cable may be coupled to the connector body at the proximal end of the connector body with the flying leads disposed within the grooves of the connector body. The mountable fastener may be part of an enclosure, mounted to an enclosure (e.g., an electronic device housing) or overmolded. In this configuration, the ends of the electrical conductors extend beyond the distal end of the connector body in spaced relative location from each other so that they may be terminated within the enclosure. The coupling of the mountable fastener to the connector body also provides strain relief of the flying leads.

In some embodiments, a process of assembling an electrical conductor assembly includes inserting a cable having a plurality of flying leads through a mountable fastener, and positioning each of the flying leads within a corresponding groove on a periphery of a connector body such that the end of each flying lead extends beyond a distal end of the connector body. The mountable fastener may be coupled to the connector body at a proximal end of the connector body to clamp the flying leads between the mountable fastener and the connector body, providing strain relief to the flying leads. The mountable fastener may be mounted to an enclosure for terminating the wires inside the enclosure.

In some embodiments, an overmold process may be used to mount the electrical conductor assembly to an enclosure via the mountable fastener. Accordingly, a panel mount connector assembly is constructed by overmolding material around the electrical conductor assembly, and specifically, the mountable fastener.

The electrical conductor assembly of the embodiments disclosed herein facilitates termination of electrical conductors within a device enclosure, thereby eliminating the need for potting or a similar technique to protect against environmental contaminants on the environmental side of the connector assembly. The elimination of potting, in the exposed environment, and moving critical electrical connections to the inside of the protected, and sometimes potted, enclosure, is expected to provide more reliable electrical connections free from any external potting application defects. The electrical conductor assembly disclosed herein also enables a cost effective way to locate and orient electrical conductors (i.e., flying leads) for automation such that the electrical conductors can be fixed in position for soldering and the like during manufacture and assembly. This, in turn, eliminates the need for additional contacts to connect the electrical conductors to a PCB or other component, resulting in cost savings and reduction of complexity while increasing reliability due to fewer parts.

Additionally, the electrical conductor assembly of the embodiments disclosed herein is configured to isolate each electrical conductor to be terminated, and the assembly provides for "localized" strain relief of the individual electrical conductors, as distinguished from "global" strain relief provided on a cable containing the multiple electrical conductors. Localized strain relief prevents the individual electrical conductors from moving relative to a jacket of the cable containing the electrical conductors, as is typically the case where only global strain relief is provided. In some embodiments, the electrical conductor assembly allows for localized and global strain relief which create a staged strain relief assembly.

The embodiments disclosed herein are described, by way of example and not limitation, with reference to electronic devices that are often used in outdoor environments, such as water endpoints for use with water metering services. However, these examples are merely illustrative, and it is to be appreciated that the electrical conductor assembly described herein may be used in any suitable device enclosure that may benefit from the numerous advantages of the instant invention. Exemplary suitable devices include, but are not limited to, televisions, set top boxes (STBs), game consoles, printers, scanners, computers, etc. Therefore, the enclosure that implements the electrical conductor assembly may be any suitable device enclosure without limiting the scope of the claims.

Example Electrical Conductor Assembly

Figure 2:
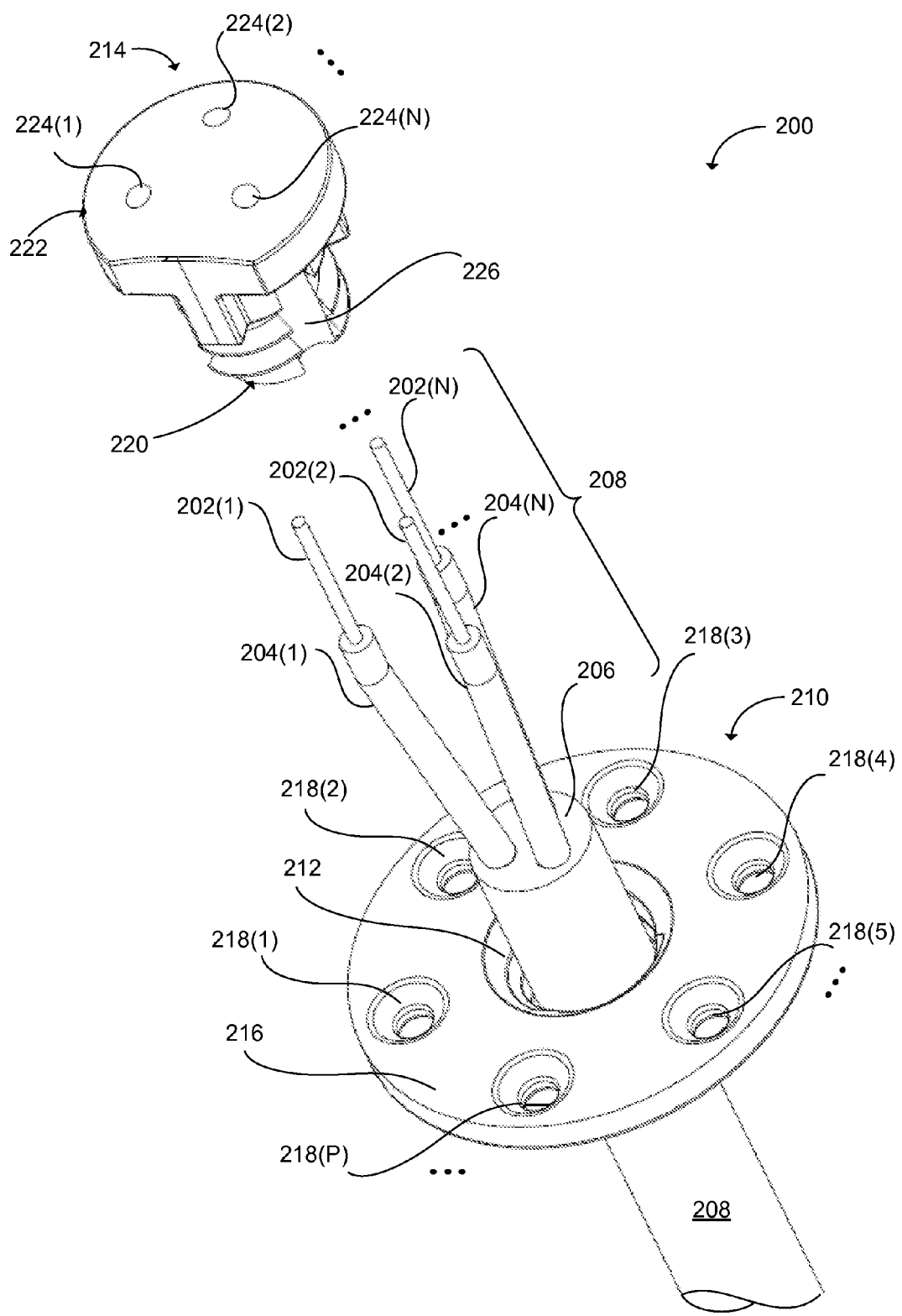
FIG. 2 illustrates an exploded, perspective view of an exemplary electrical conductor assembly according to embodiments disclosed herein, the assembly comprising a connector body and a mountable fastener.

FIG. 2 is an electrical conductor assembly 200 according to an example embodiment. The electrical conductor assembly 200 is shown from a perspective, exploded view as it would look prior to assembling the electrical conductor assembly 200. The electrical conductor assembly 200 is configured to facilitate termination of electrical conductors, such as the electrical conductors 202(1), 202(2), . . . , 202(N), within an enclosure, such as an electronic device enclosure. The electrical conductors 202(1)-(N) are each shown to be encased in insulating sheaths 204(1), 204(2), . . . 204(N). The insulating sheaths 204(1)-(N) may be a coating around the electrical conductors 202(1)-(N) of any suitable insulator material, such as a polymer (e.g., polyvinyl chloride or PVC). An outer casing 206, or jacket, that contains the electrical conductors 202(1)-(N) acts as a conduit for the multiple electrical conductors 202(1)-(N). The combination of the electrical conductors 202(1)-(N), the insulating sheaths 204(1)-(N), and the outer casing 206, is referred to herein as a "cable" 208 for purposes of discussion.

FIG. 2 shows the cable 208 with a portion of the outer casing 206 removed to expose the electrical conductors 202(1)-(N) inside. FIG. 2 further shows that part of the insulating sheaths 204(1)-(N) are removed, or stripped, to expose the electrical conductors 202(1)-(N) at the ends thereof. It is in this configuration that the unrestrained, exposed electrical conductors 202(1)-(N) are considered "flying leads." Accordingly, the term "flying lead" 202(1)-(N) will be used interchangeably with the term "electrical conductor" 202(1)-(N) herein. However, the term flying lead refers specifically to the portion of the electrical conductor 202(1)-(N) that is exposed from removal of the outer casing 206. Although three electrical conductors 202(1)-(N) are shown in FIG. 2, it is to be appreciated that a single electrical conductor 202, or any number of electrical conductors 202(1)-(N), may be included within the cable without changing the basic characteristics of the assembly 200.

In some embodiments, the electrical conductor assembly 200 further includes a mountable fastener 210 configured to receive the cable 208 through a hole 212, which may be located in the center of the mountable fastener 210. The hole 212 may be internally threaded for coupling to a connector body 214. In this sense, the mountable fastener 210 can be considered to be a nut, or similar type of threaded fastener. However, it will be appreciated that the mountable fastener 210 may comprise other suitable types of fastening elements and features to facilitate coupling the mountable fastener 210 to the connector body 214. For example, the mountable fastener 210 may have a sloped angle to the inside surface of the hole 212 to be press-fit onto the connector body 214 having a corresponding surface on the periphery of the connector body 214. Other exemplary types of fasteners can be envisioned that are suitable for coupling the mountable fastener 210 to the connector body 214, such as a snap-fit fastening mechanism, pins, set screws, hooks, joints, locks, and the like.

The mountable fastener 210 is further considered to be "mountable" by virtue of a mounting feature, such as the flange 216 including a plurality of holes 218(1), 218(2), . . . , 218(P). The holes 218(1)-(P) may be any shape or geometry and may be tapered to facilitate mounting to an enclosure, such as via a panel of an enclosure, via a PCB within the enclosure, via a panel mount connector installed in the enclosure, etc. The enclosure may be an enclosure for an electronic device. Mounting of the mountable fastener 210 to an enclosure is described in more detail below with reference to FIG. 5.

The connector body 214 is shown in FIG. 2 as being generally cylindrical in shape and having a proximal end 220 (i.e., the end near the mountable fastener 210 after assembly), and a distal end 222 (i.e., the end further away from the mountable fastener 210 after assembly). The distal end 222 comprises a plurality of holes 224(1), 224(2), . . . , 224(N) disposed about a surface, or face, of the connector body 214, at the distal end 222. The holes 224(1)-(N) may be through-holes to receive corresponding electrical conductors 202(1)-(N) in one end of the hole 224 and out the other end of the hole 224. Specifically, the tinned and un-insulated, or stripped, portions at the end of the electrical conductors 202(1)-(N) are received through the holes 224(1)-(N) by virtue of the diameter of the holes 224(1)-(N) being slightly larger than the diameter of the un-insulated electrical conductors 202(1)-(N), and slightly smaller than the diameter of the insulating sheaths 204(1)-(N). The length of the holes 224(1)-(N) should be less than the length of the stripped portions at the end of the electrical conductors 202(1)-(N) such that a portion of the un-insulated electrical conductors 202(1)-(N) extends beyond the surface of the connector body 214 at the distal end 222. The length of the stripped portion of the electrical conductors 202(1)-(N) may vary depending on the application and the type of electrical conductors used.

The holes 224(1)-(N) may be evenly distributed by relatively equal radial angles of separation for spacing and positioning purposes that facilitate automation. In some embodiments, the proximal end 220 of the connector body 214 may be externally threaded to thread into the internal threads of the mountable fastener 210. Furthermore, a plurality of grooves 226, or channels, may be defined in at least a portion of the connector body 214 which each interrupt the external threads of the connector body 214. The grooves 226 are configured to receive and guide corresponding electrical conductors 202(1)-(N) such that they are ultimately positioned at the locations of the holes 224(1)-(N) by virtue of being inserted through the holes 224(1)-(N). The ultimate orientation and position of the plurality of electrical conductors 202(1)-(N) may be specifically configured to interface and connect with specific locations/points on a PCB or other electrical component where the electrical conductors 202(1)-(N) are to be terminated.

It is to be appreciated that specific dimensions, proportions, shapes and configurations of each of the mountable fastener 210 and the connector body 214 are not specific to the present invention. For example, the mountable fastener 210 is shown in FIG. 2 as being of a circular shape, but it may just as well be of any other suitable shape, such as square, rectangular, triangular, etc. Additionally, the connector body 214 may be configured with the grooves 226 extending substantially the length of the connector body 214 and the holes 224(1)-(N) may be omitted for some implementations. Other variations and modifications can be envisioned without changing the basic characteristics of the electrical conductor assembly 200.

In some embodiments, one or more of the mountable fastener 210 and the connector body 214 may be made of plastic, such as molded plastic, or any other suitable material known in the art. For example, acrylonitrile butadiene styrene (ABS), or a suitable polymer may be used in the manufacturing of the component parts of the electrical conductor assembly 200. Suitable materials may be rigid or semi-rigid, and generally resistant to chemicals, heat and stress. Molding techniques, such as injection molding, may be utilized to manufacture any or all of the component parts (i.e., the mountable fastener 210 and/or connector body 214). Additionally, or alternatively, one or more of the mountable fastener 210 and the connector body 214 may be made of metal or a similar material that can be machined and used for manufacturing parts.

Exemplary Assembly Process

Figure 3:
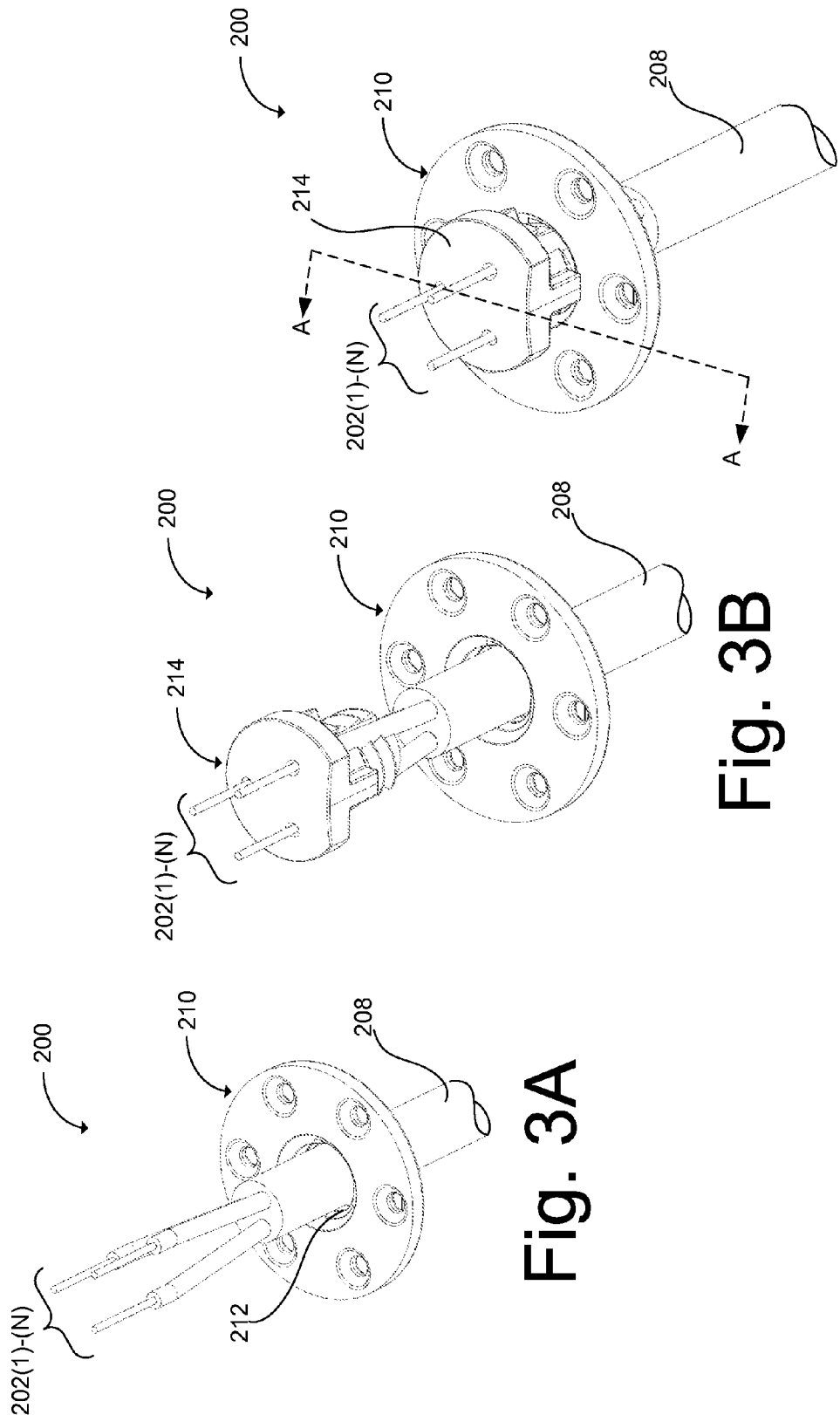
FIGS. 3A-C illustrate an exemplary process of assembling the electrical conductor assembly according to embodiments disclosed herein.

Turning now to FIGS. 3A-3C, there is illustrated an exemplary process of assembling the electrical conductor assembly 200 according to embodiments disclosed herein. As shown in FIG. 3A, the cable 208, which includes a plurality of flying leads 202(1)-(N), may be inserted through the mountable fastener 210 via the hole 212 in the center of the mountable fastener 210. As shown in FIG. 3B, the flying leads 202(1)-(N) may each be positioned within corresponding grooves in the connector body 214, such as the grooves 226 shown in FIG. 2. In some embodiments, the exposed, stripped, ends of the flying leads 202(1)-(N) may be inserted through a plurality of corresponding holes at the distal end of the connector body 214, such as the holes 224(1)-(N) of FIG. 2, leaving an exposed portion of the electrical conductors 202(1)-(N) that extends beyond the distal end of the connector body 214 in order to be terminated at a PCB or other electrical component. FIG. 3C illustrates the electrical conductor assembly 200 after the mountable fastener 210 is coupled to the connector body 214 at a proximal end of the connector body 214. The coupling shown in FIG. 3C may be accomplished by sliding the mountable fastener 210 up the cable 208 to the connector body 214 and thereafter rotating the mountable fastener 210 such that it is tightened onto the threads of the connector body 214. The mountable fastener 210 may have any suitable angular geometry on the backside of the mountable fastener 210 behind the flange 216, such as a hex-head, to allow for either manual tightening with tools (e.g., a wrench) or machine-automated tightening of the mountable fastener 210 to the connector body 214.

As will be described in more detail with reference to the following figures, the coupling of the mountable fastener 210 to the connector body 214 causes the portions of flying leads 202(1)-(N) with insulating sheaths 204(1)-(N) to be clamped between the mountable fastener 210 and the connector body 214 when substantially tightened, thereby providing localized strain relief on the individual flying leads 202(1)-(N). Furthermore, in the fully assembled configuration of FIG. 3C, the flying leads 202(1)-(N) are isolated from each other and specifically located according to the grooves 226 and the holes 224(1)-(N) of the connector body 214 so that they may interface at a termination point with a downstream operation, electrical component or PCB. The orientation and position of the electrical conductors 202(1)-(N) that is provided by the connector body 214 coupled with the mountable fastener 210 facilitates full scale automation of assembly processes because the flying leads 202(1)-(N) are fixedly oriented and located relative to each other.

Figure 4:
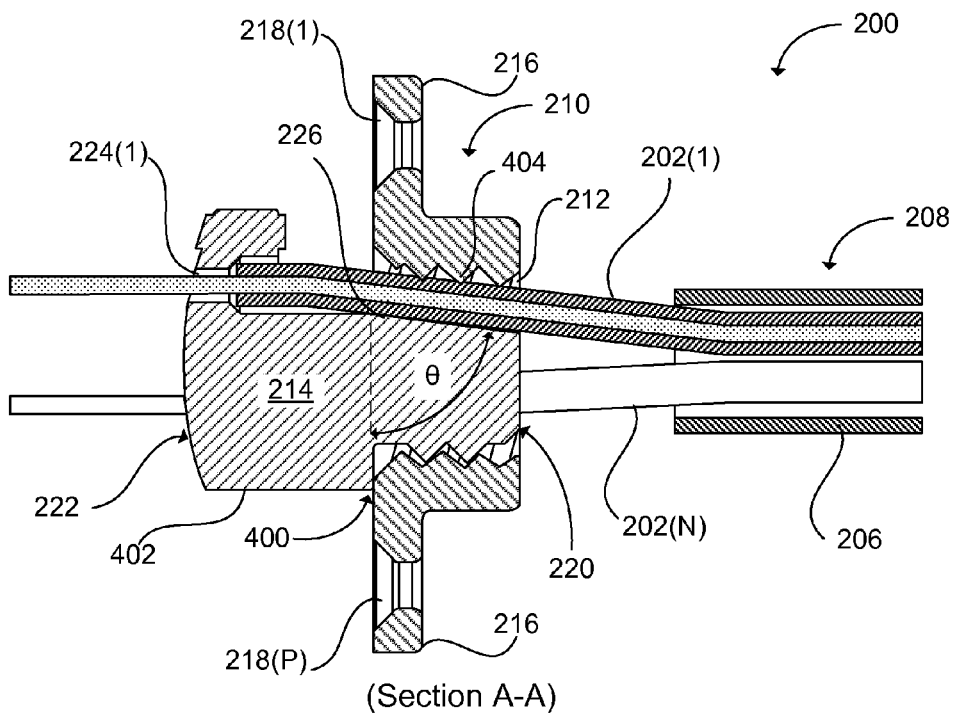
FIG. 4 illustrates a side, cross-sectional view (according to Section A-A of FIG. 3C) of a fully assembled exemplary electrical conductor assembly according to embodiments disclosed herein.

FIG. 4 illustrates a side, cross-sectional view along section line A-A of FIG. 3C showing the fully assembled exemplary electrical conductor assembly 200 according to embodiments disclosed herein. Section line A-A bisects the connector body 214, the cable 208, and the mountable fastener 210. As previously described with reference to FIG. 3C, the mountable fastener 210 may be coupled to the connector body 214, for example, by sliding the mountable fastener 210 up the cable 208 (i.e., in the leftward direction of FIG. 4) to the connector body 214 and thereafter rotating the mountable fastener 210 such that it is tightened onto the threads of the connector body 214 at the proximal end 220 of the connector body 214. FIG. 4 further illustrates that a stop 400 may be provided on the connector body such that the connector body 214 interferes with the mountable fastener 210 to prevent the connector body 214 from being tightened any further within the mountable fastener 210. This stop 400 may be any geometry, such as a ridge or protrusion on the connector body 214, that contacts the mountable fastener 210 upon threading the mountable fastener 210 onto the connector body 214 up to a predetermined distance, which may also correspond to a predetermined number of revolutions of the mountable fastener 210. Additionally, a flat side 402 of the connector body 214 may be provided on an otherwise predominantly circular/cylindrical geometry to the connector body 214, as shown in FIG. 2 and FIGS. 3A-3C. The flat surface 402 is configured to allow for precise orientation of the electrical conductors 202(1)-(N) for purposes of automation. In other words, the flat surface 402 on the connector body 214 allows for machines to determine the exact orientation of the electrical conductors 202(1)-(N) for manufacturing and/or assembly purposes, such as soldering the electrical conductors 202(1)-(N) to a PCB. The flat surface 402 is also configured to allow for precise global positioning of the electrical conductor assembly 200 during any other secondary manufacturing process (i.e., overmolding, placing into another component—plastic or other) prior to automation assembly. It is further understood that this geometry can be any geometry (rib, pocket, flat or other) that allows for rotational and translational alignment.

FIG. 4 further illustrates that the grooves 226 of the connector body 214 may be sloped, or ramped, at an angle θ from normal. This angle θ may transition from positioning the flying leads 202(1)-(N) in an adjacent relationship near the proximal end 220 of the connector body 214 to separating the flying leads 202(1)-(N) in a spaced relationship near the distal end 222 of the connector body 214. The gradual slope prevents any harsh turns or bends of the flying leads 202(1)-(N) and possible breakage. This slope also provides initial clearance for the flying leads 202(1)-(N) when the mountable fastener 210 is initially tightened over the connector body 214. As the mountable fastener 210 is tightened further, the inclined slope of the grooves 226 causes the insulating sheaths 204(1)-(N) of the flying leads 202(1)-(N) to interfere with internal threading 404 in the hole 212 of the mountable fastener 210. That is, as the mountable fastener 210 is tightened onto the connector body 214, the insulating sheaths 204(1)-(N) are compressed and clamped between the mountable fastener 210 and the connector body 214 during the final revolutions of the mountable fastener 210 during the coupling. The full effect of this clamping is reached once the stop 400 abuts the mountable fastener 210. This configuration provides localized strain relief on the individual flying leads 202(1)-(N), which is desirable so that stress and movement of the cable 208 on the right side of FIG. 4 does not transfer stress to the termination points of the electrical conductors 202(1)-(N), thereby preventing damage to any connection points and joints.

Accordingly, the internal threading 404 of the mountable fastener 210 may be somewhat blunt so that the threads do not pierce or cut through the insulating sheaths 204(1)-(N), even when fully tightened. Rather, the insulating sheaths 204(1)-(N) are depressed and indented at points of contact with the internal threading 404 when the mountable fastener 210 is coupled to the connector body 214. In some embodiments, strain relief may also be provided on the outer casing 206 of the cable 208 such that the outer casing 206 is also clamped between the mountable fastener 210 and the connector body 214, providing an additional "global" strain relief on the entire cable 208.

Figure 5:
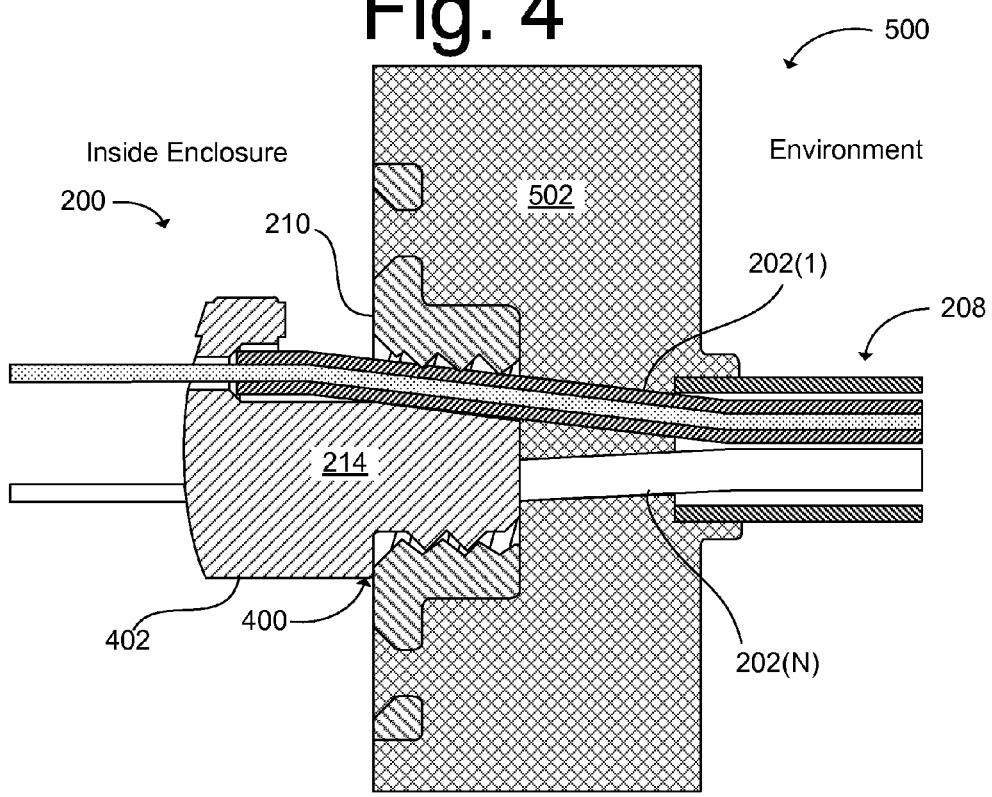
FIG. 5 illustrates a side, cross-sectional view (according to Section A-A of FIG. 3C) of an exemplary electrical conductor assembly mounted to a panel.

FIG. 5 illustrates a side, cross-sectional view of an exemplary electrical conductor assembly 200 shown in FIG. 4 when overmolded into a panel mount connector assembly 500 that affixes, mounts or installs into an additional enclosure. For illustrative purposes, FIG. 5 shows a portion of the overmolded panel mount connector assembly 500 that may be installed into the additional enclosure, such as an enclosure of an electronic device. In this example, the electronic device may be situated in an outdoor environment, which is represented on the right side of FIG. 5. The left side of FIG. 5 represents the space inside the enclosure, such as the space inside the housing of the electronic device. FIG. 5 shows that the electrical conductor assembly 200 facilitates termination of the electrical conductors 202(1)-(N) within the enclosure, such that the electrical conductors 202(1)-(N), as well as electrical components they are connected to, may be protected from ingress of water and other contaminants found in the environment. Furthermore, the electrical conductor assembly 200 also provides a structure, or backbone, for the electrical conductor assembly 200 to be overmolded with a panel or similar structure to make the panel mount connector assembly 500. For example, the mountable fastener 210 may be integrated directly into a panel or similar structure by using a single or multi-material molding process, such as an overmold process, to form the panel mount connector assembly 500 that may be installed in the final enclosure. Throughout the molding process, the electrical conductor assembly 200 remains fixed in position and orientation by virtue of its geometry. As shown in FIG. 5, a resin may be molded over the electrical conductor assembly 200. During this molding process, the resin fills the plurality of holes 218(1)-(P) in the flange 216 of the mountable fastener 210, thereby creating a secure and rigid mount of the mountable fastener 210 into a body portion 502, such as a panel or similar structure, of the panel mount connector assembly 500. FIG. 5 shows the electrical conductor assembly 200 overmolded into the body portion 502 after an exemplary overmold operation.

It is to be appreciated that suitable alternative techniques for mounting the mountable fastener 210 to the body portion 502 may be utilized without changing the basic characteristics of the invention. For example, the body portion 502 may be preformed and the mountable fastener 210 may be mounted in the body portion 502 by using external threads on the mountable fastener 210 that are to be received within a corresponding female-threaded hole in the body portion 502. As other examples, the mountable fastener 210 may be adhered to the body portion 502 using a suitable adhesive, and/or the mountable fastener 210 may be mounted with bolts, screws, rivets, pins, nails, lugs, clamps, or the like. As yet another example, the mountable fastener 210 may be mounted to an enclosure as a preformed part of the enclosure itself.

As one illustrative example implementation, the panel mount connector assembly 500 shown in FIG. 5 may be a panel 500 of an enclosure for an electronic device. A process of making and assembling the electronic device may benefit from the location and orientation of the electrical conductors 202(1)-(N) for automation. It is to be appreciated that the application of the assembly 500 may include, but is not limited to, utility meters (e.g., electric, gas, water, etc.), fluid meters (e.g., sewage, nuclear waste, oil, molten metal, etc.), consumer electronics (e.g., televisions, set-top boxes, game consoles, personal computers, laptops, etc.), and the like. Additionally, in view of the strain-relief advantages of embodiments described herein, electronic devices that are not necessarily implemented in outdoor environments are also expected to benefit from the electrical conductor assembly disclosed in the embodiments herein.

Figure 6:
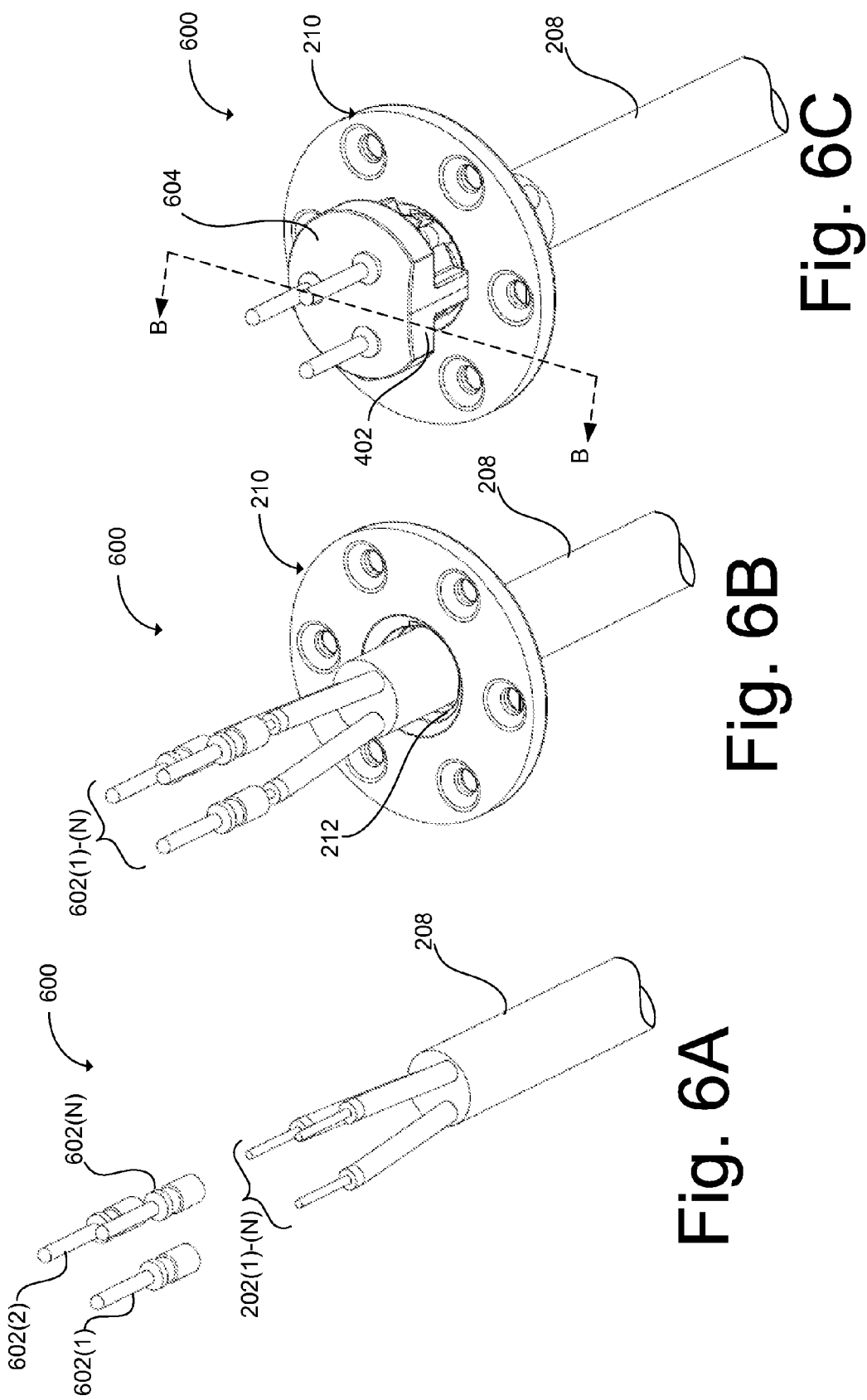
FIGS. 6A-C illustrate an exemplary process of assembling an electrical conductor assembly according to an alternative embodiment disclosed herein.

FIGS. 6A-6C illustrate an exemplary process of assembling an electrical conductor assembly 600 according to an alternative embodiment disclosed herein. FIG. 6A shows a plurality of contacts 602(1), 602(2), . . . , 602(N), or pins, which may be incorporated into the electrical conductor assembly 600 of this alternative embodiment. The electrical conductors 202(1)-(N), or flying leads that have been exposed by removal of the outer casing 206 of the cable 208 and individually stripped of a portion of the insulating sheaths 204(1)-(N), may be inserted into, or otherwise coupled to the plurality of contacts 602(1)-(N) corresponding to the electrical conductors 202(1)-(N). In some embodiments, the electrical conductors 202(1)-(N) are soldered into the contacts 602(1)-(N). As shown in FIG. 6B, the cable 208, which includes the plurality of flying leads 202(1)-(N) coupled to the contacts 602(1)-(N), may be inserted through the mountable fastener 210 through the hole 212 in the center of the mountable fastener 210. FIG. 6C shows that each of the contacts 602(1)-(N) may be positioned within corresponding grooves in a connector body 604, such as the grooves 226 shown in FIG. 2. In some embodiments, the contacts 602(1)-(N) may be inserted through a plurality of corresponding holes at the distal end of the connector body 604, such as the holes 224(1)-(N) of FIG. 2, with a portion of the contacts 602(1)-(N) that extend beyond the distal end of the connector body 604 in order to be terminated at a PCB or other electrical component configured to receive the contacts 602(1)-(N). FIG. 6C further illustrates that the mountable fastener 210 may be coupled to the connector body 604 at a proximal end of the connector body 604, similar to the coupling described and shown with reference to FIG. 3C. The orientation and position of the contacts 602(1)-(N) that is provided by the connector body 604 coupled with the mountable fastener 210 facilitates full scale automation of assembly processes because the contacts 602(1)-(N) are fixedly oriented and located relative to each other and flat side 402 to assist in automated assembly.

Figure 7:
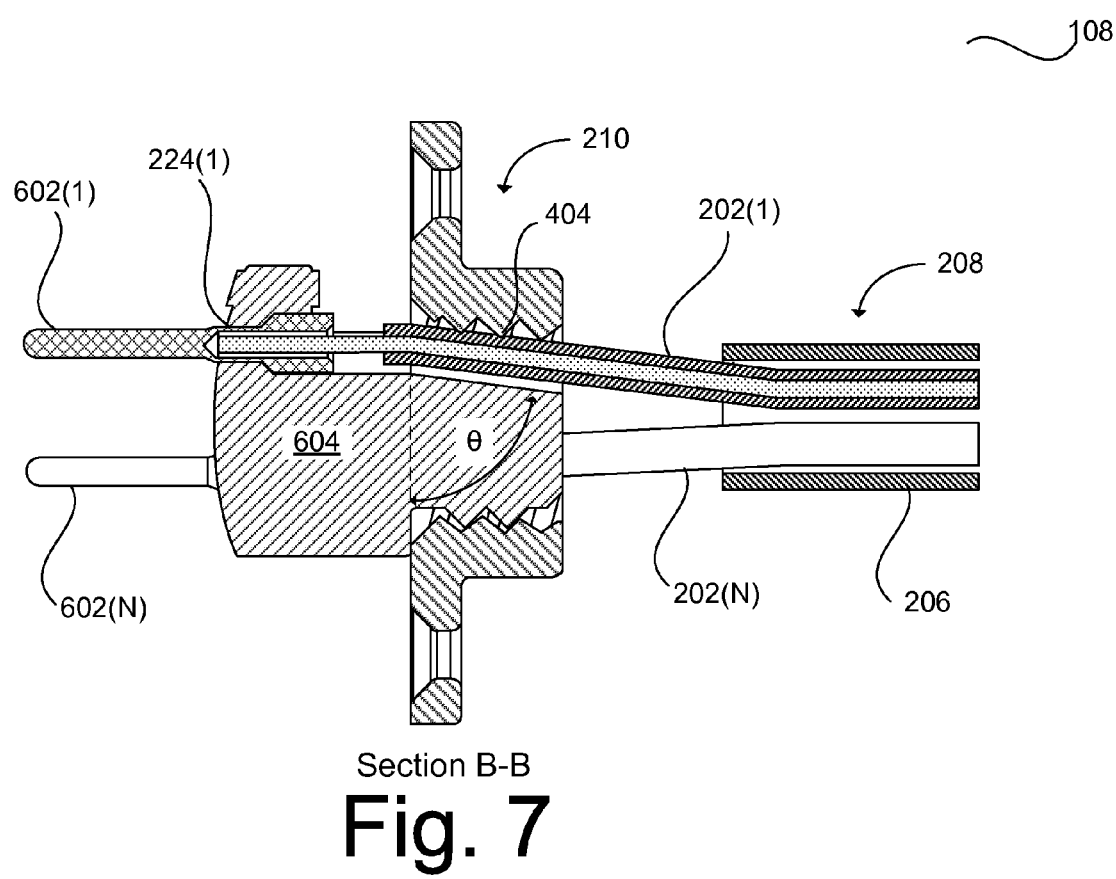
FIG. 7 illustrates a side, cross-sectional view (according to Section B-B of FIG. 6C) of a fully assembled exemplary electrical conductor assembly according to an alternative embodiment disclosed herein.

FIG. 7 illustrates a side, cross-sectional view along section line B-B of FIG. 6C showing the fully assembled exemplary electrical conductor assembly 600 according to an alternative embodiment disclosed herein. Section line B-B bisects the connector body 604, the cable 208, and the mountable fastener 210. The electrical conductor assembly 600 may have some or all of the same or similar features shown and described with reference to the electrical conductor assembly 200 of FIGS. 2-4.

FIG. 7 further illustrates that the contacts 602(1)-(N) may be inserted through holes in the distal end of the connector body 604, such as the holes 224(1)-(N) described with reference to FIG. 2. The electrical conductor assembly 600 allows for the inclusion of the contacts 602(1)-(N) for terminating the electrical conductors 202(1)-(N) within an enclosure, as an alternative embodiment to the electrical conductor assembly 200.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electrical conductor assembly comprising:
a connector body having a proximal end and a distal end and comprising a plurality of grooves defined on a periphery of the connector body in a direction from the proximal end to the distal end, the plurality of grooves configured to receive corresponding electrical conductors and to fixedly position the electrical conductors relative to each other, wherein the proximal end comprises external threads; and
a mountable fastener configured to couple to the connector body at the proximal end of the connector body and to mount to an enclosure, the mountable fastener comprising a hole having internal threads for coupling to the connector body at the proximal end having the external threads, the internal threads of the mountable fastener interfering with the electrical conductors to compress and clamp the electrical conductors between the internal threads of the mountable fastener and the plurality of grooves of the connector body when the mountable fastener is coupled to the connector body with the electrical conductors positioned within the plurality of grooves of the connector body.

2. The electrical conductor assembly of claim 1, wherein the plurality of grooves are sloped to provide initial clearance for the electrical conductors when the mountable fastener is initially coupled to the connector body.

3. The electrical conductor assembly of claim 1, wherein the plurality of grooves interrupt the external threads on the connector body on the periphery of the connector body.

4. The electrical conductor assembly of claim 1, wherein the mountable fastener comprises a flange including a plurality of holes positioned on the flange circumferentially about the hole that is positioned in a center of the mountable fastener.

5. The electrical conductor assembly of claim 1, wherein the connector body further comprises a plurality of holes at the distal end of the connector body that correspond to the plurality of grooves, the plurality of holes each configured to receive an end of a respective electrical conductor.

6. The electrical conductor assembly of claim 5, wherein the plurality of holes each have a diameter larger than the respective electrical conductor without an insulating sheath and smaller than the respective electrical conductor with the insulating sheath.

7. The electrical conductor assembly of claim 5, wherein the connector body is cylindrically shaped and the plurality of holes are circumferentially distributed about a face of the connector body at the distal end of the connector body.

8. The electrical conductor assembly of claim 5, wherein the plurality of holes are each further configured to receive a contact that is coupled to the end of the respective electrical conductor.

9. The electrical conductor assembly of claim 1, wherein the connector body further comprises a stop configured to interfere with the mountable fastener upon threading the mountable fastener onto the connector body up to a predetermined distance.

10. An apparatus comprising:
a connector body comprising:
- a proximal end having external threads,
- a distal end, and
- a plurality of grooves configured to guide a plurality of flying leads in a direction from the proximal end to the distal end for termination at a component beyond the distal end; and a mountable fastener configured to couple to the connector body at the proximal end of the connector body and to mount to an enclosure housing the component, the mountable fastener comprising a hole having internal threads for coupling to the connector body at the proximal end having the external threads, the internal threads of the mountable fastener interfering with the flying leads to compress and clamp the flying leads between the internal threads of the mountable fastener and the plurality of grooves of the connector body when the mountable fastener is coupled to the connector body.

11. The apparatus of claim 10, wherein the mountable fastener comprises a plurality of holes to secure the mountable fastener to a panel for mounting to the enclosure.

12. The apparatus of claim 10, wherein the plurality of grooves are sloped to gradually separate the flying leads from an adjacent relationship near the proximal end of the connector body to a spaced relationship near the distal end of the connector body.

13. The apparatus of claim 10, the plurality of grooves interrupt the external threads on the connector body on the periphery of the connector body.

14. The apparatus of claim 13, wherein the connector body further comprises a stop configured to interfere with the mountable fastener upon threading the mountable fastener onto the connector body up to a predetermined distance.

15. The apparatus of claim 10, wherein the connector body further comprises a plurality of holes at the distal end of the connector body that correspond to the plurality of grooves, the plurality of holes each configured to receive an end of a respective flying lead.

16. The apparatus of claim 15, wherein the plurality of holes each have a diameter larger than the respective flying lead without an insulating sheath and smaller than the respective flying lead with the insulating sheath.

17. The apparatus of claim 15, wherein the connector body is cylindrically shaped and the plurality of holes are circumferentially distributed about a face of the connector body at the distal end of the connector body.

18. The apparatus of claim 15, wherein the plurality of grooves and the plurality of holes extend substantially a length of the connector body from the proximal end to the distal end.

19. A method of assembling an electrical conductor assembly comprising:
- inserting a cable having a plurality of flying leads through a hole of a mountable fastener having internal threads;
- positioning each of the plurality of flying leads within corresponding grooves defined on a periphery of a proximal end of a connector body such that an end of each of the plurality of flying leads extends beyond a distal end of the connector body, the proximal end of the connector body having external threads;
- coupling the mountable fastener to the connector body at the proximal end of the connector body by inserting the proximal end of the connector body into the hole of the mountable fastener and rotating the mountable fastener relative to the connector body to thread the mountable fastener onto the connector body such that the flying leads are compressed and clamped between the internal threads of the mountable fastener and the grooves of the connector body; and
- mounting the mountable fastener to an enclosure.

20. The method of claim 19, wherein the connector body further comprises a stop, and wherein the coupling the mountable fastener to the connector body comprises tightening the mountable fastener onto the connector body to a point at which the stop interferes with the mountable fastener.

21. The method of claim 19, wherein the mounting the mountable fastener to the enclosure comprises attaching the mountable fastener to a panel, and mounting the panel with the mountable fastener to the enclosure.

* * * * *